United States Patent Office 3,290,360
Patented Dec. 6, 1966

3,290,360
CONDENSATION OF METHYLBENZYL ACETATE
John L. Tveten, Baytown, Tex., assignor, by mesne assignments, to Esso Research and Engineering Company, Elizabeth, N.J., a corporation of Delaware
No Drawing. Filed June 10, 1964, Ser. No. 374,143
5 Claims. (Cl. 260—491)

The present invention relates to the production of plasticizing oils having particular utility in polyvinyl chloride floor tile. More particularly, the present invention relates to the production of a nonstaining plasticizer containing polynuclear esters of predominantly two and three aromatic rings.

It has been found that by the condensation of toluene with formaldehyde in the presence of acetic and sulfuric acid, an admixture of products is obtained which, upon fractionation, can be used as a nonstaining plasticizer for polyvinyl chloride floor tile. Upon investigation of the plasticizer thus produced, it was found that the esters in the admixture were responsible for most of the plasticizing action. The esters were polynuclear, comprising two to three aromatic rings connected by methylene bridges, and substituted with methyl groups in each nucleus. Although the plasticizing action of the binuclear ester, ditolylmethanemethylol acetate, was shown to be exceptionally good, the high volatility of this composition caused considerable losses of the plasticizer during the fabrication of floor tile from a plastic mass containing this plasticizer. Further, the admixture obtained by the condensation of toluene with formaldehyde under the above conditions contain polynuclear hydrocarbons which, although having a certain amount of plasticizing ability, were in effect merely diluents for the excellent plasticizer (the polynuclear esters).

It is thus particularly desirable that a method be provided for increasing the production of esters having three rings and for decreasing the formation of polynuclear hydrocarbons during the condensation reaction.

It has surprisingly been found that methylbenzyl acetate can be condensed with itself in the presence of sulfuric acid and, if desired, acetic acid, to produce a plasticizing oil having an increased content of esters of three aromatic nuclei and containing substantially no polynuclear hydrocarbons. The ester content is at least 90 weight percent. By condensing one molar part of methylbenzyl acetate with from 0.1 to 1.0 molar part of sulfuric acid having a concentration of 30 to 80 weight percent, at a temperature of 70° C. to 150° C., the formation of polynuclear hydrocarbons is suppressed and the formation of polynuclear esters is enhanced. Further, a four-ring ester is obtained, which has not been obtained when using toluene as the feedstock. This four-ring ester is desirable as a constituent (up to about 10 weight percent of the plasticizer) since it decreases the volatility thereof. Thus, the present invention provides a method whereby a highly superior plasticizing oil can be obtained.

The variables of the present process can be generally described as follows. The sole hydrocarbon feedstock to the reaction is methylbenzyl acetate, which itself may be produced by the condensation of toluene and formaldehyde in the presence of sulfuric and acetic acids, as is well known in the art. A methylbenzyl acetate product stream can be obtained by fractionation of the reaction products of such a reaction. The condensation reaction can be accomplished by mixing one mole of methylbenzyl acetate with from 0 to 3.0 molar parts of aqueous acetic acid (50 to 100 weight percent concentration), maintaining the admixture under agitation, and adding aqueous sulfuric acid (30 to 80 weight percent concentration) dropwise or continuously over a reaction period of about 1 minute to about 6 hours, after which the reaction is continued for an additional 0 to 6 hours for a total reaction time of at least one-half hour, but not more than about 6 hours. Throughout the reaction period, a temperature of 70° C. to 150° C. and a pressure of 0 to 55 p.s.i.g. is maintained. Preferably, the pressure is atmospheric and the temperature is sufficient to maintain the reaction zone under reflux conditions. If suppression of formation of four-ring esters is desired, lower temperatures (e.g. 70° C. to 80° C.) or shorter reaction times can be employed.

At the conclusion of the reaction time, the reagents in the reaction zone will separate into an oil phase and an aqueous sulfuric acid phase, and can be separated by decantation. The oil phase then can be water washed and neutralized by percolation over sodium carbonate and vacuum distilled in order to recover a plasticizing oil boiling above 200° C. at 20 mm. Hg. The fractional separation is chosen to remove the methylbenzyl acetate which remains unreacted in the product stream, as well as any ditolylmethane which might be formed. If desired, the fractional separation can also remove the ditolylmethane-methylol acetate, the two-ring ester.

The concentration of the sulfuric acid must be maintained above about 30 weight percent. Failure to maintain the sulfuric acid concentration above this minimum results in the appearance in the product of substantial amounts of dixylylether, and a fraction thought to be methylbenzyl alcohol. The temperature must be maintained above about 70° C., or likewise dixylylether will appear in the plasticizer product in substantial amounts. Thus, it is seen that both the concentration of sulfuric acid and the temperature of reaction must be maintained above the indicated minimum values to cause the conversion of the dixylylether into the other forms, presumably the polynuclear esters. Higher temperatures (above 100° C.) will be employed when using the lower (e.g., 30 to 50 weight percent) concentrations of sulfuric acid.

In order to illustrate the present invention, the following examples are given. Example 2 with a one-hour reaction time is the preferred manner of carrying out the invention.

Example 1

Four mols (120 g.) of paraformaldehyde having a molecular weight of 180 to 3000, 3.75 mols (225. g.) of glacial acetic acid, and 4 mols (368 g.) of toluene were admixed in a reaction flask and heated to 100° C. While agitating the paraformaldehyde, acetic acid and toluene reaction admixture, 0.735 mol (103 g.) of 70 weight percent sulfuric acid was added to the mixture dropwise over a period of 2 hours. Dropwise addition of the sulfuric acid was continuous over this period. At the end of 2 hours, the addition of sulfuric acid was terminated and the reaction maintained for 4 more hours at 100° C. (the reflux temperature for the admixture). The pressure during the reaction was substantially atmospheric. Samples were taken at the end of 6 hours. At the end of the 6-hour reaction period, agitation was stopped and the reaction mixture separated into an acid layer and a supernatant oil layer. The oil layer was withdrawn and water washed three times with 250 cc. of water and thereafter dried over calcium chloride. The hydrocarbon sample was analyzed and found to contain the following constituents.

TABLE I

| Aromatic Nuclei | Constituent | Amount, Weight percent |
|---|---|---|
| 1 ring | Toluene | 7.7 |
| Do | Methylbenzyl acetate | 10.2 |
| 2 rings | Ditolylmethane | 44.6 |
| Do | Ditolylmethanemethylol acetate | 21.8 |
| 3 rings | Bis-xylyltoluene | 9.4 |
| Do | Bis-xylyltoluenemethylol acetate | 5.0 |
| 4 rings | Bis-xylylditolylmethane | 1.3 |

The product separated by fractionation to remove the methylbenzyl acetate and ditolylmethane would result in an oil having an ester-to-hydrocarbon ratio of 2:5.

*Example 2*

One mol (164 g.) of methylbenzyl acetate and 1 mol (60 g.) of glacial acetic acid were admixed and heated to 100° C. To this reaction mixture was added dropwise over a 1-hour period 0.85 mol (26 g.) of 70 weight percent aqueous sulfuric acid while maintaining the temperature at 100° C. and agitating the reaction mass at atmospheric pressure. The reaction conditions were continued for an additional three hours, at which time agitation was stopped and the entire reaction mixture was poured into 100 cc. of water to cause phase separation. A lower acid phase and a supernatant oil phase were formed. The supernatant oil phase was decanted, water washed and dried over calcium chloride.

Samples were taken during the course of the reaction and an analysis thereof is shown below.

TABLE II

|  | 15 Min. | 1 Hr. | 2 Hrs. | 4 Hrs. | Aromatic Nuclei |
|---|---|---|---|---|---|
| Methylbenzyl acetate | 87.2 | 15.5 | 9.1 | 4.4 | 1 ring. |
| Ditolylmethane |  | 0.5 | 0.5 | 0.5 | 2 rings. |
| Dixylylether | 8.4 |  |  |  | Do. |
| Ditolylmethanemethylol acetate | 3.1 | 34.5 | 34.5 | 27.2 | Do. |
| Bis-xylyltoluene |  | 0.1 | 0.1 | 0.1 | 3 rings. |
| Bis-xylyltoluenemethylol acetate | 1.3 | 41.2 | 46.0 | 50.9 | Do. |
| Bis-xylylditolylmethane |  |  |  |  | 4 rings. |
| Bis-xylylditolylmethanemethylol acetate. |  | 8.2 | 10.0 | 16.9 | Do. |

At one-hour reaction time, the production of 2- and 3-ring esters is optimized, with only a trace of hydrocarbons being formed.

*Example 3*

Methylbenzyl acetate (0.5 mol, 82 g.) was mixed with 0.25 mol (36 g.) of 70 weight percent aqueous sulfuric acid and heated to 100° C. in a reaction flask under agitation. The reaction was continued for six hours at atmospheric pressure. Samples were taken at the end of 2, 4, and 6 hours, and the samples were analyzed. Following is a tabular presentation of the analysis.

TABLE III

|  | 2 Hrs. | 4 Hrs. | 6 Hrs. | Aromatic Nuclei |
|---|---|---|---|---|
| Methylbenzyl acetate | 0.3 | 0.3 | 0.3 | 1 ring. |
| Ditolylmethane | 0.6 | 0.7 | 0.7 | 2 rings. |
| Dixylylether |  |  |  | Do. |
| Ditolylmethanemethylol acetate. | 48.8 | 28.6 | 18.9 | Do. |
| Bis-xylyltoluene |  |  |  | 3 rings. |
| Bis-xylyltoluenemethylol acetate. | 36.1 | 39.8 | 45.0 | Do. |
| Bis-xylylditolylmethane |  |  |  | 4 rings. |
| Bis-xylylditolylmethane-methylol acetate. | 14.2 | 30.6 | 35.1 | Do. |

It is seen that virtually no hydrocarbon is formed in the condensation of methylbenzyl acetate in either Example 2 or Example 3.

*Example 4*

The process of Example 2 was repeated using, however, 0.25 mol each of methylbenzyl acetate and acetic acid and 0.05 mol of 30 weight percent sulfuric acid. At the end of 4 and 6 hours, samples were taken and found to have the following compositions.

TABLE IV

|  | 2 Hrs. | 4 Hrs. | Aromatic Nuclei |
|---|---|---|---|
| Methylbenzyl alcohol | 17.6 | 10.5 | 1 ring. |
| Methylbenzyl acetate | 60.0 | 36.4 | Do. |
| Ditolylmethane | 0.6 | 1.2 | 2 rings. |
| Dixylylether | 14.4 | 26.9 | Do. |
| Ditolylmethanemethylol acetate | 7.4 | 22.0 | Do. |
| Bis-xylyltoluene |  |  | 3 rings. |
| Bis-xylyltoluenemethylol acetate |  | 3.0 | Do. |
| Bis-xylylditolylmethane |  |  | 4 rings. |
| Bis-xylylditolylmethanemethylol acetate |  |  | Do. |

It is seen that at the lower acid strength an alcohol was formed and dixylylether also appeared in the final product. When using 30 weight percent sulfuric acid, the ether and alcohol formation can be reduced by employing temperatures in excess of 100° C. to convert the dixylylether into polynuclear acetates.

*Example 5*

The process of Example 2 was repeated using 0.25 mol each of methylbenzyl acetate and acetic acid, and 0.05 mol of 70 weight percent sulfuric acid. However, the reaction temperature was only 55° C. at atmospheric pressure. Samples were taken at the end of 2, 4, and 6 hours and the following analysis obtained.

TABLE V

|  | 2 Hrs. | 4 Hrs. | 6 Hrs. | Aromatic Nuclei |
|---|---|---|---|---|
| Methylbenzyl acetate | 88.2 | 70.5 | 63.6 | 1 ring. |
| Ditolylmethane | 0.5 | 0.7 | 0.5 | 2 rings. |
| Dixylylether | 4.4 | 6.8 | 7.8 | Do. |
| Ditolylmethanemethylol acetate | 6.4 | 22.0 | 26.4 | Do. |
| Bis-xylyltoluene |  |  |  | 3 rings. |
| Bis-xylyltoluenemethylol acetate. |  |  | 1.7 | Do. |
| Bis-xylylditolylmethane |  |  |  | 4 rings. |
| Bis-xylylditolylmethane-methylol acetate. |  |  |  | Do. |

It will be seen that at the lower temperature, even though 70 weight percent sulfuric acid was used, dixylylether was formed and very little 3-ring ester was obtained. Conversion was low (36.4%). Temperatures above 70° C., therefore, should be used.

The process is applicable to other methylbenzyl esters if desired, such as the butyrate, propionate, etc.

Having disclosed in detail the process of the present invention, and having set forth a preferred embodiment thereof, what is desired to be protected by Letters Patent should be determined not by the specific examples herein given, but rather by the appended claims.

I claim:

1. A method of producing a stain-resistant plasticizing oil which comprises admixing one molar part of methylbenzyl acetate with from 0 to 3.0 molar parts of glacial aqueous acetic acid having a concentration of 50 to 100% by weight,
adding to said methylbenzyl acetate from 0.1 to 1.0 molar part of aqueous sulfuric acid having a concentration of 30 to 80% by weight,
over a period of 1 minute to 6 hours under reaction conditions including a temperature of 70° C. to 150° C. and
a pressure of 0 to 55 p.s.i.g.,
maintaining the reaction conditions for from 0 to 6 hours after completion of sulfuric acid addition, for a total reaction time of at least one-half hour,
separating the sulfuric acid from the oil phase,
and recovering from said oil phase a product boiling above 200° C. at 20 mm. Hg pressure, and having an ester content of at least 90 weight percent.

2. A method in accordance with claim 1 wherein the sulfuric acid is added over a period of 2 hours and the reaction is maintained for an additional 4 hours after completion of sulfuric acid addition.

3. A method in accordance with claim 2 wherein 1 molar part of glacial acetic acid and 0.85 molar part of 70 weight percent aqueous sulfuric acid are employed, and the reaction conditions include a pressure of 0 p.s.i.g. and a temperature of 100° C.

4. A method of producing a stain-resistant plasticizing oil which comprises
admixing one molar part of methylbenzyl acetate with from 0 to 3.0 molar parts of acetic acid to form an admixture,
adding to said admixture from 0.1 to 1.0 molar part of aqueous sulfuric acid having a concentration of 30 to 80 weight percent,
while maintaining the admixture under agitation and at reaction conditions including
a temperature of 70° C. to 150° C.,
a pressure of 0 to 55 p.s.i.g., and
a reaction time of one-half hour to 6 hours,
to obtain an oil product,
separating the sulfuric acid and the oil product,
and recovering from said hydrocarbon product a plasticizing oil boiling above 200° C. at 20 mm. Hg pressure and having an ester content of at least 90 weight percent.

5. A method in accordance with claim 4 wherein 0.85 molar part of 70 weight percent sulfuric acid is employed and reaction conditions include a pressure of 0 p.s.i.g. and a temperature of 100° C.

References Cited by the Examiner
UNITED STATES PATENTS
2,761,884   9/1956   Koorevaar _____ 260—668

LORRAINE A. WEINBERGER, *Primary Examiner.*

V. GARNER, *Assistant Examiner.*